United States Patent [19]

Porth et al.

[11] Patent Number: 4,841,769
[45] Date of Patent: Jun. 27, 1989

[54] APPARATUS FOR MEASURING VELOCITY OF FLOW

[75] Inventors: Wolfgang Porth, Frank am Main; Wolfgang Weibler, Hofheim, both of Fed. Rep. of Germany

[73] Assignee: VDO Adolf Schindling AG, Frankfurt am Main, Fed. Rep. of Germany

[21] Appl. No.: 21,300

[22] Filed: Mar. 3, 1987

[30] Foreign Application Priority Data

Mar. 3, 1986 [DE] Fed. Rep. of Germany ....... 3606851

[51] Int. Cl.⁴ .............................................. B01F 1/68
[52] U.S. Cl. .................................. 73/204.26; 73/118.2
[58] Field of Search ................... 73/204, 118.2, 204.26

[56] References Cited

U.S. PATENT DOCUMENTS

| | | | |
|---|---|---|---|
| 4,320,655 | 3/1982 | Kammermaier et al. | 73/204 |
| 4,478,076 | 10/1984 | Bohrer | 73/204 |
| 4,581,928 | 4/1986 | Johnson | 73/204 |
| 4,633,578 | 1/1987 | Aine et al. | 73/204 |
| 4,680,963 | 7/1987 | Tabata et al. | 73/204 |
| 4,696,188 | 9/1987 | Higashi | 73/204 |
| 4,735,099 | 4/1988 | Ohta et al. | 73/204 |

FOREIGN PATENT DOCUMENTS

| | | | |
|---|---|---|---|
| 1488012 | 10/1977 | United Kingdom | 73/204 |
| 2138566 | 10/1984 | United Kingdom | 73/204 |

Primary Examiner—Herbert Goldstein
Attorney, Agent, or Firm—Martin A. Farber

[57] ABSTRACT

In an apparatus for measuring the velocity of flow of fluids, and particularly of the intake air of internal combustion engines, having an electrically heatable resistance layer which is applied in insulated manner on a support and is in thermal contact with the flowing fluid, the support is developed in rectangular shape with a flat central part bearing the resistance layer and is provided with reinforcement strips integral with it on at least three sides. Futhermore, the central part is provided at its edges with slits which adjoin the reinforcement strips. The apparatus of the invention can be produced preferably from silicon by etching and can be developed to receive futher resistors and other electronic elements.

2 Claims, 1 Drawing Sheet

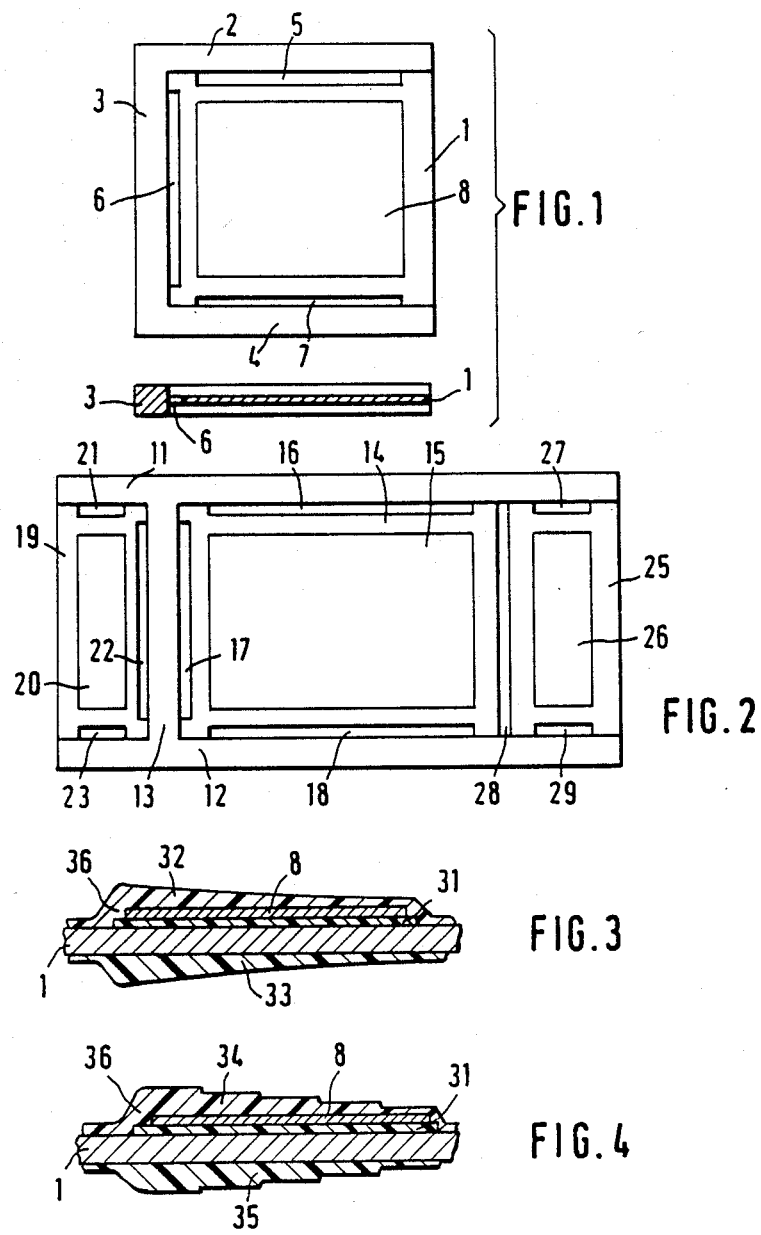

APPARATUS FOR MEASURING VELOCITY OF FLOW

FIELD AND BACKGROUND OF THE INVENTION

The present invention relates to an apparatus for measuring the velocity of flow of fluids, and particularly of the intake air of internal-combustion engines, having an electrically heatable resistance layer which is applied in insulated manner on a support and is in thermal contact with the flowing fluid.

Sensors for measuring the mass of air drawn in are required, in particular, for the control of internal-combustion engines. In known sensors a resistance layer which is applied to a flat support is traversed by a current, this resulting in heating. Depending on the velocity of flow of the air flowing around the sensor, a larger or smaller amount of heat is withdrawn from the resistance layer and support. By the use of a resistor material of temperature-dependent resistance the current can be regulated in such a manner as to obtain a constant temperature above that of the air. The current required for this is then a measure of the velocity of flow.

A number of, in part, contradictory requirements are made on such sensors. Thus, for instance, good heat transfer between the flowing fluid and the resistance layer is necessary for a sufficiently high sensitivity of response. In order to assure this, the flowing fluid is moved past on both sides of the resistance layer or support, which, however, is only suitably effective if the support is of good thermal conductivity and/or is correspondingly thin. High thermal conductivity of the support material results in a rapid equalization of temperature on the support, which favors a rapid response time.

Furthermore, the thermal and mechanical stability of such sensors must satisfy high demands. Finally, economical manufacture is necessary, to which simple assembly contributes.

SUMMARY OF THE INVENTION

It is an object of the present invention to provide an apparatus for measuring the velocity of flow which substantially satisfies the above-indicated requirements.

According to the invention, the support is rectangular with a flat central part (1) which bears the resistance layer (8) and it is provided with reinforcement strips (2, 3, 4) integral with it on at least three sides.

The apparatus in accordance with the invention has the advantage that the support for the resistance layer can be made very thin while good mechanical stability is nevertheless assured.

A further development of the invention is attained by providing the edges of the central part (1) with slits (5, 6, 7) which adjoin the reinforcement strips (2, 3, 4). This has the advantage that the thermal resistance between the support and the reinforcement strips is increased so that the greatest possible proportion of the heat produced in the resistance layer is given off via the flowing fluid.

Another further development resides in the fact that two opposite reinforcement strips (11, 12) extend beyond a third reinforcement strip (13) which is enclosed by them and bear a further flat part on which a further resistance layer (20) is applied, and that said further flat part (19) is provided with slits (21, 22, 23) on the edges thereof which contact the reinforcement strips (11, 12, 13).

This further development assures a favorable arrangement of the temperature sensor which is present in preferred arrangements. In this case the further resistance layer lies in front of the heatable resistance layer, as seen in the direction of flow. By this further development, good thermal uncoupling of the two sensors is established.

A third further development of the invention is characterized by the fact that a third flat part (25) is arranged on the side of the central part (14) facing away from the third reinforcement strip (13) and is separated from the central part (14) by another slit (28). On this third flat part there is arranged a third temperature-dependent resistor which can be used to detect the direction of flow. In internal combustion engines there may occur that the direction of flow is reversed briefly, as a result of which the air heated by the heatable resistor enters the temperature sensor, resulting in erroneous measurements. By comparison of the resistance values of the temperature sensor and the third resistor, the direction of flow can be noted and reporting of the measured value suppressed in the case of the wrong direction of flow.

One material which is excellently suited for the manufacture of the apparatus according to the invention is silicon. It has sufficient mechanical strength and high thermal conductivity. Furthermore, it can be excellently machined by the methods known in the semiconductor art.

In one method for the production of apparatuses according to the invention, a part having the thickness of the reinforcement strips is subjected to an etching process after suitable covering masks have been applied. For this, both anisotropic and isotropic etching are possible. Anisotropic etching has, however, the advantage that, with suitable alignment of the crystal axes, depressions retain the contour established by the mask over their entire depth.

The method for the manufacture of the apparatuses in accordance with the invention can be advantageously supplemented by producing the slits by means of laser cutting.

Further, the further resistance layer (20) can serve as temperature sensor and the third resistance layer (26) for the determination of the direction of flow.

Another further development of the apparatus according to the invention in which the resistance layer (8) consists of a suitably doped semiconductor material, particularly silicon, makes it possible, in advantageous fashion, to employ the methods known from semiconductor technology for the production of the resistance layer. In particular, by suitable doping, the electrical properties and particularly the temperature coefficient can be fixed within wide limits.

Also according to the invention the resistance layer (8) can be made of metal, for instance platinum or nickel.

In known apparatuses for measuring the velocity of flow it has been found that the heat transfer coefficient between the resistance layer and the flowing fluid is greatest at the edge of the apparatus opposite the flow and decreases in the direction of flow. In this way a temperature gradient is produced within the resistance layer, which in its turn leads to a reduction in the speed of response.

This disadvantage is avoided in another further development of the invention in the manner that layers (32, 33, 34, 35) of low thermal conductivity are so applied to the resistance layer (8), the support and the side of the support (1) facing away from the resistance layer that the local heat transmission coefficient between the flowing fluid and the resistance layer (8) is at least approximately constant in the direction of flow. The thickness of the layers (32, 33 or 34, 35) can decrease continuously or stepwise in the direction of flow.

In one advantageous embodiment of the invention, the reinforcement strips (2, 3, 4, 11, 12, 13) are about 0.25 to 1 mm thick and the material (1, 14) is about 0.1 mm thick. With this embodiment sufficient mechanical rigidity is assured and, at the same time, low inertia due to the small layer thickness of the central part.

BRIEF DESCRIPTION OF THE DRAWINGS

With the above and other objects and advantages in view, the present invention will become more clearly understood in connection with the detailed description of preferred embodiments, when considered with the accompanying drawing, of which:

FIG. 1 is a top view and cross section of an embodiment having a resistance layer;

FIG. 2 is a top view of an embodiment having two additional resistance layers; and FIGS. 3 and 4 are each a section through the support and the applied layers for various further developments of the invention.

The same parts are provided with the same reference numbers in the figures.

DETAILED DESCRIPTION OF THE PREFERRED EMBODIMENTS

In the apparatus shown in FIG. 1, a flat central part 1 whose thickness is about 0.1 mm is provided, on each of three sides, with a reinforcement strip 2, 3, 4. The entire body is made in one piece. Various methods, particularly micromechanical methods, are suitable for the production of the apparatus of FIG. 1. As mentioned at the start, silicon is particularly suitable as material, it being capable of being advantageously brought by anisotropic etching into the shape shown. For this purpose, a silicon wafer having the thickness of the reinforcement strips and the necessary area is provided with masks which cover the edge regions and is subjected to the etching liquid until the central part is sufficiently thin. The etching process can be effected from both sides, so that the apparatus which is shown in cross section is obtained. However, it is also possible to remove material only from one side, so that the central part 1 is flush, for instance, with the lower edge of the reinforcement strips.

For the reduction of the heat conduction between the central part 1 and the reinforcement strips 2, 3, 4, slits 5, 6, 7 are provided produced, for instance, by laser cutting.

A resistance layer 8 which represents the actual sensor is applied to the central part 1, as will be explained in further detail in connection with FIGS. 3 and 4.

In the embodiment shown in FIG. 2, the reinforcement strips 11, 12 are extended beyond the reinforcement ledge 13 which is enclosed by them. The central part 14, which is somewhat larger in the embodiment of FIG. 2, bears the resistance layer 15. Furthermore, slits 16, 17 and 18 are also provided. Between the protrusions to the left of the reinforcement strips 11, 12 there is arranged another flat part 19 on which a further resistance layer 20 is applied. In order to reduce the heat conduction, slits 21, 22, 23 are again provided. The resistance layer 20 is used as temperature sensor and is located therefore in front of the resistance layer 15, as seen in the direction of flow. Both resistance layers are a part, in known manner, of a bridge circuit to which a difference amplifier is connected. Such circuits are sufficiently well known and need not be explained within the scope of the present invention.

In the embodiment shown in FIG. 2, there is also provided a third flat part 25 on which a further resistance layer 26 is arranged. The flow of heat to the reinforcement strips 11, 12 and the central part 14 is reduced by slits 27, 28 and 29. As mentioned at the start, the third layer 26 can be used to recognize the direction of flow.

The layer thicknesses in particular have been shown exaggerated in FIGS. 3 and 4.

For the support 1, use can basically be made of silicon which does not have the high degree of purity required for electronic components. However, it is also entirely possible, within the scope of the invention, to build up further resistors on the support 1 in addition to the resistance layer 8 and possibly to develop the corresponding electric circuits by the monolithic technique. For this, however, suitably pure silicon is required.

For the insulating of the support from the resistance layer 8 there is employed a passivation 31, which can be produced, for instance, by nitriding, oxidizing or coating with glass or plastic.

For the production of the resistance layer 8, a layer of highly pure polysilicon is applied on the passivation 31, which layer receives the required electrical properties by means of processes known in the semiconductor art, only a few steps of which will be mentioned below. After recrystallization by means of laser or argon high-pressure light, ion implantation takes place, whereby the temperature coefficient of the resistance layer can be fixed within wide limits. Higher temperature coefficients than in the case of metallic resistance layers are possible here, so that greater sensitivity and possibly a simpler electric circuit are possible. However, for adaptation to the specific case of use, the temperature coefficient can also be reduced to a desired value.

That is followed by a temperature treatment for the healing of the crystal as well as various steps to produce the required structure and finally the contacting. The structure can, for instance, be formed that the resistance layer 8 forms a meandering conductive path.

After the production of the resistance layer 8, a protective layer is applied to the resistance layer 8 and to the opposite surface of the support 1, said layer protecting the apparatus from, in particular, chemical influences of the fluid to be measured.

In accordance with a further development of the invention, the protective layers 32, 33 are so applied that the local heat transmission coefficient between the flowing fluid and the resistance layer 8 is at least approximately constant, as seen in the direction of flow. Without this measure, the local heat transfer coefficient is generally, with reference to the left-to-right flow direction in FIG. 2, greatest in the vicinity of the edge 36 which is opposite the flow of air, and decreases with increasing distance from said edge. In this way, there is produced in the direction of flow a temperature gradient within the resistance layer which is dependent on the velocity of flow and results in a relatively long response time of the known sensors. As a result of the decreasing layer thickness of the layers 32 and 33 in the direction of flow, this effect is counteracted so that the response time is reduced. While the layer thickness decreases continuously in the apparatus according to FIG. 3, the thickness of the layers 34 and 35 decreases stepwise in the apparatus of FIG. 4. Vapor deposition methods or printing methods are suitable for the production of the protective layers, depending on the material. The central part 1 and the layer 8 may be formed of a metal such as platinum or nickel as shown in FIGS. 3 and 4, or of a semiconductor such as silicon.

We claim:

1. In an apparatus for measuring the velocity of flow of fluids, and particularly of the intake air of internal-combustion engines, the apparatus having an electrically heatable resistance layer which is applied in insulated manner on a support, which layer is in thermal contact with the flowing fluid, the improvement wherein the support is rectangular and includes a flat central part which carries a resistance layer, the support further comprising reinforcement strips integral one-piece therewith on at least three sides of the support for securing the resistance layer, the apparatus further comprising outer thermally insulating layers of low thermal conductivity overlying said resistance layer, said support and the side of said support facing away from the resistance layer, and wherein the insulating layers decrease in thickness continuously in the direction of flow.

2. In an apparatus for measuring the velocity of flow of fluids, and particularly of the intake air of internal combustion engines, the apparatus having an electrically heatable resistance layer which is applied in insulated manner on a support, which layer is in thermal contact with the flowing fluid, the improvement wherein the support is rectangular and includes a flat central part which carries a resistance layer, the support further comprising reinforcement strips integral one-piece therewith on at least three sides of the support for securing the resistance layer, the apparatus further comprising outer thermally insulating layers of low thermal conductivity overlying said resistance layer, said support and the side of said support facing away from the resistance layer, and wherein the insulating layers decrease in thickness stepwise in the direction of flow.

* * * * *